Patented Apr. 23, 1946

2,399,120

UNITED STATES PATENT OFFICE 2,399,120

STABLE RED PHOSPHORUS

Loren C. Hurd, Jenkintown, Pa., assignor to Röhm & Haas Company, Philadelphia, Pa.

No Drawing. Application February 24, 1941, Serial No. 380,399

14 Claims. (Cl. 23—223)

This invention relates to a method of stabilizing red phosphorus and to the stabilized product resulting therefrom.

Red phosphorus is an important component of certain types of percussion caps, primers, incendiary charges, and the like. It is customary to pack the phosphorus, either alone or admixed with oxidizing agents, friction agents and/or promoters, in metal containers, usually of copper or brass. The charge may be packed either in a dry or slightly moist condition. In certain applications the materials mixed with red phosphorus are water-soluble. If an attempt is made to pack the reaction mixture while wet, there is a tendency for the water-soluble components to segregate and thus reduce the efficiency of the resulting dry charge. Although dry packing is preferred, such practice has been of limited application since, during normal handling, a slight oxidation of the phosphorus takes place with the result that the product becomes hygroscopic. Such material is no longer free-flowing and tends to stick to feed tubes, measuring devices and the like, used in the packing operation. If the phosphorus in a moist condition, either alone or in admixture with other ingredients, is placed in a metal container, any phosphoric acid present or subsequently formed may severely corrode the metal container.

In many applications, it is not practical to isolate completely the dry phosphorus or phosphorus-containing mixtures in an air-tight closure. As a result, gradual oxidation occurs followed by absorption of moisture to produce acids and a wet product which causes corrosion of metal with which it comes into contact. A further undesirable feature of the oxidation of red phosphorus and subsequent hydration is that in many cases the burning characteristics of the charge are seriously altered.

I have found that, if particles of red phosphorus are treated with a small amount of a lyophilic protein-containing colloid and dried under conditions such that a thin film is deposited around the individual particles, there is produced a product which has been effectively stabilized against air oxidation without altering the free-flowing characteristics of the red phosphorus.

In carrying out my process, a protein, such as glue, gelatine, albumin, or other similar lyopholic colloid, may be dispersed in water or other suitable solvent and the dispersion mixed with the red phosphorus particles. The slurry may then be filtered, in which case protein remains on the individual particles as a result of adsorption; or the slurry or paste may be dehydrated in which event all added protein is associated with the particles of phosphorus in the final product. The protein may also be precipitated into the phosphorus by adding a selected non-aqueous solvent to a suspension of the phosphorus particles in a protein solution, or the protein may be added in alkaline solution such as is used to extract yellow phosphorus from crude red material. In the latter instance, it is of particular advantage to use a protein, such as sodium caseinate, dispersed in a sodium carbonate solution.

As a rule the amount of glue, gelatine or other protein necessary to protect the phosphorus particles against oxidation is small. Usually about 0.2% will be found to be sufficient, but smaller amounts, for instance of the order of 0.1%, have been found to be effective in certain cases. Larger amounts, for example, of from about 1% to about 5%, may also be used. In general, larger or smaller amounts may be used depending upon the characteristics desired in the finished product.

The following tables illustrate the advantages of my invention. The data shown in Table 1 were observed as a result of a series of runs using commercial red phosphorus particles which had been ground to a fine powder and with which had been admixed varying amounts of ordinary bone glue contained in an amount of water equal to 70% of the weight of the phosphorus. After thorough mixing and grinding, the admixtures were dried in a vacuum oven at 75° C., and thereafter broken up, weighed, and exposed to air over a considerable period of time. Weights were taken at the end of each seven days to determine the relative stability of the samples. The table shows the percentage change in weight. Comparison is made with commercial red phosphorus particles treated in the same manner except that no glue was added to the water. The material last mentioned is referred to in the table as "B".

Table 1

| Sample No. | Percent glue | 7 days | 14 days | 21 days | 28 days | 49 days |
|---|---|---|---|---|---|---|
| B | 0.00 | 0.47 | 1.20 | 1.79 | 2.50 | 3.68 |
| 1 | 0.10 | −0.05 | 0.05 | 0.02 | 0.04 | 0.18 |
| 2 | 0.20 | 0.00 | 0.16 | 0.31 | 0.62 | 1.36 |
| 3 | 0.50 | −0.02 | 0.08 | 0.06 | 0.12 | 0.35 |
| 4 | 1.00 | −0.01 | 0.07 | 0.03 | 0.04 | 0.12 |
| 5 | 2.00 | 0.22 | 0.09 | 0.05 | 0.07 | 0.09 |
| 6 | 5.00 | 0.10 | 0.12 | 0.12 | 0.10 | 0.12 |

Weighed samples of commercial red phosphorus which had been ground to substantially uniform size were admixed with concentrated solutions of the following proteins:

(1) Purified photographic gelatine
(2) Technical gelatine
(3) Naphtha-extracted glue
(4) Ordinary bone glue
(5) Dried blood
(6) Egg albumin
(7) Casein (solubilized with sodium hydroxide)
(8) Casein (solubilized with calcium hydroxide)

In this series of runs, pastes formed by grinding the phosphorus particles with solutions of the lyophilic protein colloids were dried and reground to produce particles of substantially uniform size. These materials, along with a control sample containing no protein but otherwise treated in the same manner, were exposed to air over a period of several weeks and the gain in weight was noted at the end of each seven days. Table 2, below, shows the preserving effect of the proteins listed above. The figures given under the column headed "per cent protein" are the percentages by weight of the several proteins contained in the samples, and the figures under the last four headings in the table denote the percentage increase in weight of the samples at the end of the periods noted.

Table 2

| Sample No. | Percent protein | 7 days | 14 days | 21 days | 28 days |
| --- | --- | --- | --- | --- | --- |
| 7 | 0.00 | 0.41 | 1.03 | 2.15 | 2.16 |
| 8 | 0.50 pur. gelatine | 0.24 | 0.75 | 1.78 | 2.00 |
| 9 | 1.00 pur. gelatine | 0.17 | 0.48 | 1.25 | 1.33 |
| 10 | 1.50 pur. gelatine | 0.12 | 0.35 | 0.97 | 1.02 |
| 11 | 1.50 tech. gelatine | 0.12 | 0.35 | 0.95 | 1.02 |
| 12 | 0.50 ext. glue | 0.24 | 0.74 | 1.72 | 1.82 |
| 13 | 1.00 ext. glue | 0.24 | 0.78 | 1.81 | 1.90 |
| 14 | 1.50 ext. glue | 0.18 | 0.57 | 1.40 | 1.50 |
| 15 | 1.50 ord. glue | 0.13 | 0.37 | 0.96 | 1.06 |
| 16 | 0.50 dried blood | 0.06 | 0.29 | 0.91 | 1.07 |
| 17 | 1.00 dried blood | 0.02 | 0.11 | 0.42 | 0.24 |
| 18 | 1.50 dried blood | 0.09 | 0.13 | 0.41 | 0.20 |
| 19 | 0.50 egg albumin | 0.05 | 0.25 | 0.81 | 0.99 |
| 20 | 1.00 egg albumin | 0.10 | 0.15 | 0.40 | 0.20 |
| 21 | 1.50 egg albumin | 0.10 | 0.14 | 0.44 | 0.22 |
| 22 | 0.50 casein (NaOH) | 0.02 | 0.14 | 0.53 | 0.62 |
| 23 | 1.00 casein (NaOH) | 0.06 | 0.14 | 0.39 | 0.20 |
| 24 | 1.50 casein (NaOH) | 0.10 | 0.13 | 0.46 | 0.13 |
| 25 | 0.50 casein (Ca(OH)$_2$) | 0.13 | 0.46 | 1.14 | 1.27 |
| 26 | 1.00 casein (Ca(OH)$_2$) | 0.06 | 0.16 | 0.45 | 0.60 |
| 27 | 1.50 casein (Ca(OH)$_2$) | 0.07 | 0.10 | 0.18 | 0.14 |

Thus, there are a variety of lyophilic protein-containing colloids that are suitable for use in accordance with the present invention. As will be noted, thin films of lyophilic protein colloids upon particles of red phosphorus greatly increase the stability thereof. The tendency of particles of red phosphorus to oxidize when exposed to the atmosphere is substantially retarded by the colloid films and yet the desired free-flowing characteristics of the red phosphorus are retained so that it may be employed in admixture with other materials in the numerous commercial applications in which freely flowing particles of red phosphorus, which will not readily oxidize when exposed to air, are desired. In this stabilized form reactivity of the red phosphorus with admixed materials is fully retained, and the flow characteristics thereof are at least equal to those of commercial red phosphorus in the dry state.

I claim:

1. Freely flowing particles of red phosphorus stabilized against oxidation by a thin coating of protein on each of the individual particles.

2. Freely flowing particles of red phosphorus stabilized against oxidation by a thin coating of casein on each of the individual particles.

3. Freely flowing particles of red phosphorus stabilized against oxidation by a thin coating of dried blood on each of the individual particles.

4. Freely flowing particles of red phosphorus stabilized against oxidation by a thin coating of glue on each of the individual particles.

5. Freely flowing particles of red phosphorus stabilized against oxidation by a thin coating of protein on the individual particles, the proportion of protein being less than approximately 5% by weight.

6. Freely flowing particles of red phosphorus stabilized against oxidation by a thin coating of protein on the individual particles, the proportion of protein being less than approximately 2% by weight.

7. A composition of matter comprising freely flowing particles of red phosphorus stabilized against oxidation by means of a thin coating of a lyophilic protein colloid on each of the individual particles.

8. A composition of matter comprising freely flowing particles of red phosphorus stabilized against oxidation by means of a thin coating of a lyophilic protein colloid on the individual particles, said lyophilic protein colloid comprising from approximately 0.1% to approximately 5% of the weight of the mass.

9. A composition of matter comprising dry freely flowing red phosphorus particles having a thin coating of a lyophilic protein colloid on the individual particles, the proportion of colloid being from approximately 0.1% to approximately 2% by weight.

10. The process of forming stable freely flowing particles of red phosphorus which comprises coating particles of red phosphorus with a thin film of a lyophilic protein colloid dispersed in a liquid medium, and thereafter removing the liquid medium from said particles by drying.

11. The process of forming stable freely flowing particles of red phosphorus which comprises coating particles of red phosphorus with a thin film of casein dispersed in a liquid medium, and thereafter removing the liquid medium from said particles by drying under vacuum.

12. The process of forming stable freely flowing particles of red phosphorus which comprises coating particles of red phosphorus with a thin film of casein dispersed in a liquid medium, and thereafter removing the liquid medium from said particles by drying.

13. The process of forming stable freely flowing particles of red phosphorus which comprises coating particles of red phosphorus with a thin film of dried blood dispersed in a liquid medium, and thereafter removing the liquid medium from said particles by drying.

14. The process of forming stable freely flowing particles of red phosphorus which comprises coating particles of red phosphorus with a thin film of glue dispersed in a liquid medium, and thereafter removing the liquid medium from said particles by drying.

LOREN C. HURD.